United States Patent [19]

Mitani et al.

[11] Patent Number: 4,969,049
[45] Date of Patent: Nov. 6, 1990

[54] RADIATION IMAGE INFORMATION PROCESSING SYSTEM

[75] Inventors: Yasushi Mitani; Masao Shigyo, both of Kanagawa, Japan

[73] Assignee: Fuji Photo Film Co., Ltd., Kanagawa, Japan

[21] Appl. No.: 368,909

[22] Filed: Jun. 19, 1989

Related U.S. Application Data

[63] Continuation of Ser. No. 67,853, Jun. 30, 1987, abandoned.

[51] Int. Cl.[5] .............................................. H04N 1/21
[52] U.S. Cl. ...................................... 358/296; 382/57
[58] Field of Search .................... 358/296, 300, 302; 382/41, 48, 57; 364/521; 250/327.2

[56] References Cited

U.S. PATENT DOCUMENTS

4,603,254 7/1986 Takano et al. .
4,672,683 6/1987 Matsurda ............................ 340/707
4,743,959 5/1988 Fredriksen ......................... 358/133

Primary Examiner—Mark J. Reinhart
Attorney, Agent, or Firm—Sughrue, Mion, Zinn, Macpeak & Seas

[57] ABSTRACT

A radiation image information processing system includes an image reader for reading radiation image information and converting the same to image data represented by a digital signal, an image output apparatus for producing the image data as a visible image, an image filing apparatus for recording the image data together with retrievel data therefor on a randomly accessible recording medium and for reading the image data from the recording medium based on the retrieval data, and an image processing controller for controlling the image reader, the image output apparatus, and the image filing apparatus and processing the image data. The image data is produced by the image output apparatus and simultaneously stored in the recording medium by the image filing apparatus.

13 Claims, 7 Drawing Sheets

RADIATION IMAGE INFORMATION PROCESSING SYSTEM

This is a Continuation of application Ser. No. 07/067,853 filed June 30, 1987, now abandoned.

BACKGROUND OF THE INVENTION

The present invention relates to a radiation image information processing system, and more particularly to a radiation image information processing system for reading radiation image information from a stimulable phosphor sheet, and processing the read-out radiation image information to record it on a film or display it on a CRT or the like, and simultaneously to record image data representing the radiation image information and retrieval data thereof on an randomly accessible recording medium.

There has been developed a radiation image recording and reproducing system for producing a radiation transmitted image of an object using a stimulable phosphor sheet. Many patent applications have been filed in relation to the developed radiation image recording and reproducing system (see, for example, Japanese Laid-Open Pat. Publications Nos. 55-12429, 55-103472, 55-116340, and 55-8797). The radiation image recording and reproducing system has found wider use particularly in the medical field. When a certain phosphor is exposed to a radiation such as X-rays, $\alpha$-rays, $\beta$-rays, $\gamma$-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded on a recording medium such as a photographic photosensitive material or displayed as a visible image on a CRT or the like.

It has been general practice in the medical field to record radiation image information on an X-ray film. Since an X-ray film with radiation image information recorded therein is legally required to be kept for a certain period of time, the number of X-ray films kept in a medical facility such as a hospital is considerably large. Therefore, medical facilities with a radiographic system have to have a space large enough to keep such X-ray films. Measures must also be taken to shield stored X-ray films from moisture and extraneous light in order to keep them in a good condition over a long period of time.

Adequate medical diagnosis requires quick access to a particular X-ray film containing image information. However, it takes quite a long time to manually pick up a certain X-ray film from a vast number of stored X-ray films. This is particularly problematic when an emergency need arises for an exposed X-ray film for use in an operation, for example, because the time-consuming manual retrieval procedure might result in a serious accident.

SUMMARY OF THE INVENTION

It is a major object of the present invention to provide a radiation image information processing system for reading radiation image information from a recording medium, and processing the read-out radiation image information to record it on a film or display it on a CRT or the like as a visible image, and simultaneously to record image data representing the radiation image information and retrieval data thereof on a randomly accessible recording medium, so that the radiation image information can easily be stored and supervised, the space needed for storing the radiation image information is reduced, and any desired radiation image information which has been recorded can quickly be retrieved.

Another object of the present invention is to provide a radiation image information processing system comprising an image reader for reading radiation image information and converting the same to image data represented by a digital signal, an image output apparatus for producing the image data as a visible image, an image filing apparatus for recording the image data together with retrieval data therefor on a randomly accessible recording medium and for reading the image data from the recording medium based on the retrieval data, and an image processing controller for controlling the image reader, the image output apparatus, and the image filing apparatus and processing the image data, the arrangement being such that the image data is produced by the image output apparatus and simultaneously stored in the recording medium by the image filing apparatus.

Still another object of the present invention is to provide a radiation image information processing system wherein the image output apparatus includes first image output means for producing the image data on a photographic photosensitive film, and second image output means for producing the image data on a CRT display.

Yet still another object of the present invention is to provide a radiation image information processing system wherein the image filing apparatus includes a hard disk device for storing the retrieval data and an optical disk device for storing the retrieval data and the image data.

A further object of the present invention is to provide a radiation image information processing system wherein the image filing apparatus includes an interface module for controlling transfer of the image data and the retrieval data between the image reader and the image output apparatus.

A yet further object of the present invention is to provide a radiation image information processing system wherein the interface module has a first interface for processing the image data and a second interface for processing the retrieval data, the first and second interfaces storing the respective data simultaneously in the optical disk device and the hard disk device.

A still further object of the present invention is to provide a radiation image information processing system wherein the interface module further includes an input/output processor for controlling the first and second interfaces and a buffer memory connected to the first interface.

A yet still further object of the present invention is to provide a radiation image information processing system wherein the image filing apparatus includes a codec for compressing the image data to be recorded on the recording medium and for expanding the image data read from the recording medium, and a buffer connected between the codec and a driver for reading the image data from the recording medium.

Another object of the present invention is to provide a radiation image information processing system wherein the codec comprises a line buffer interface, a line buffer, a line buffer interface controller, a codec controller, an encoder, a decoder, a buffer interface, and a command controller.

Still another object of the present invention is to provide a radiation image information processing system wherein the line buffer has an image buffer for storing plural lines of image data.

Yet another object of the present invention is to provide a radiation image information processing system wherein the buffer interface has means for packing the image data after it has been compressed.

Yet still another object of the present invention is to provide a radiation image information processing system wherein the line buffer is controlled by the line buffer interface controller to adjust the rate of input or output image data and the rate of output or input image data.

A further object of the present invention is to provide a radiation image information processing system wherein the image data is combined with first image transfer control data indicative of the starting and terminal ends of one image and second image transfer control data indicative of the starting and terminal ends and the identification number of each scanning line of one image, the arrangement being such that the image data is transferred, one scanning line at a time, between the interface module of the image filing apparatus and a recording module which records the image data on the recording medium or reads the image data from the recording medium.

A still further object of the present invention is to provide a radiation image information processing system wherein the image data comprises gradation data indicative of gradations of pixels in lines and parity data added to respective gradation data, the arrangement being such that when a parity error is detected in gradation data corresponding to a certain pixel, the pixel is estimated by and replaced with a pixel in the vicinity thereof or a line containing the certain pixel is estimated by and replaced with a line in the vicinity thereof.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
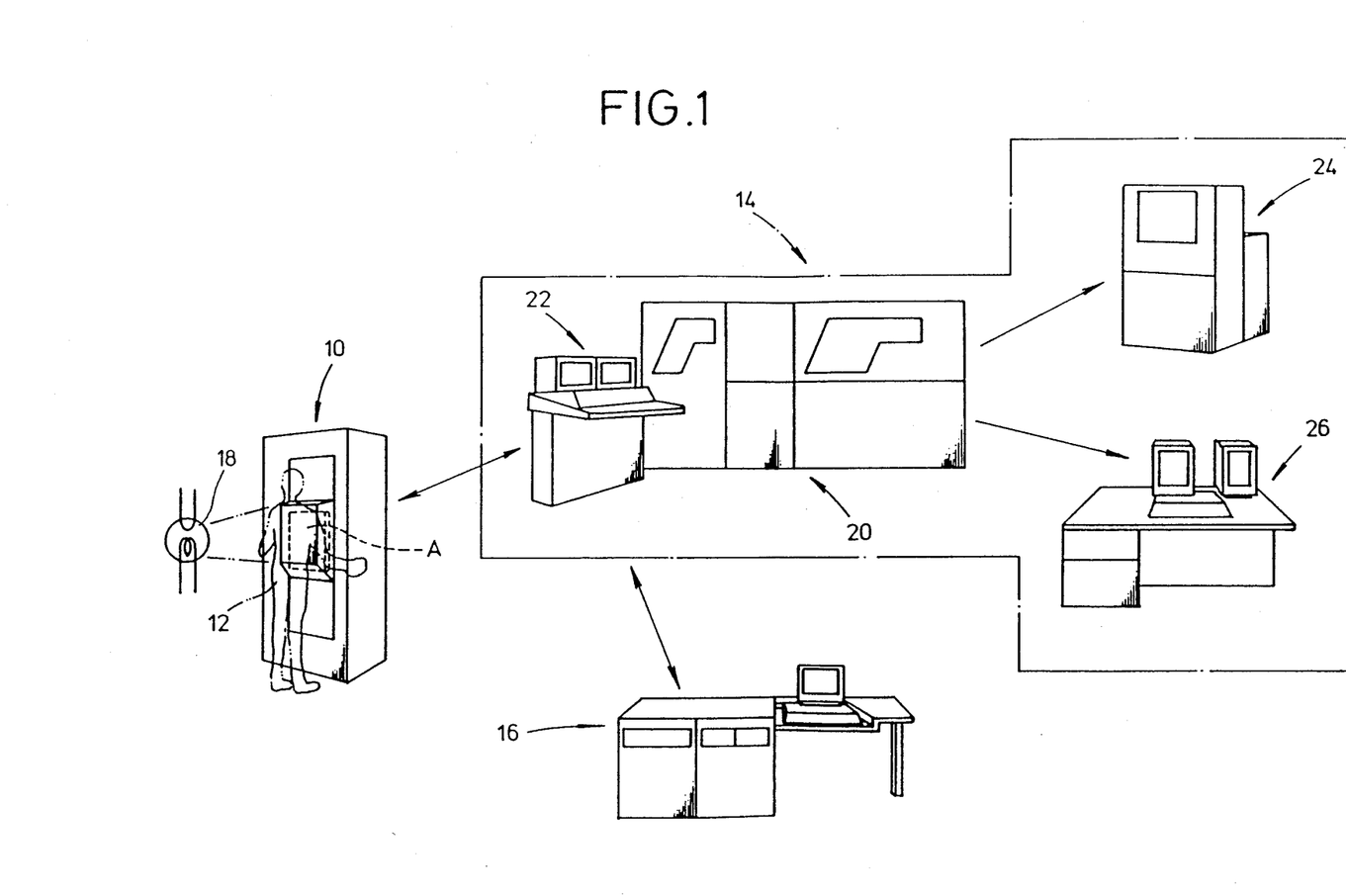
FIG. 1 is a schematic diagram of a radiation image information processing system according to an embodiment of the present invention.

FIG. 1 illustrates a radiation image information processing system according to an embodiment of the present invention. The radiation image information processing system basically comprises an image input/output apparatus 14 for photoelectrically reading under prescribed condition, and converting to a digital signal, the radiation transmitted image of an object 12, such as a patient under examination, which has been recorded on a stimulable phosphor sheet A by an exposure device 10, and for processing the signal for recording on a photographic photosensitive material or display on a CRT or the like, and an image filing apparatus 16 for recording image data and retrieval data therefor as converted to the digital signal on an optical disk or the like, and for reading the recorded data when required. Designated by the reference numeral 18 is an X-ray source for producing the radiation transmitting image of the object 12 and recording the same on the stimulable phosphor sheet A.

Figure 3:
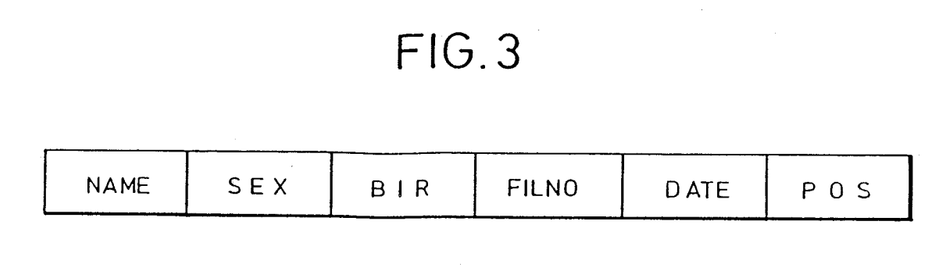
FIG. 3 is a diagram showing retrieval data.

The retrieval data is inherent data allotted to the image data. As shown in FIG. 3, the retrieval data is composed of various items of patient information such as the name of the patient NAME, the sex of the patient SEX, the date of birth of the patient BIR, and other items of exposure information such as the image number FILNO, the date of exposure DATE, and the exposed area POS.

The image input/output apparatus 14 includes an image reader 20 for photoelectrically reading the radiation image information recorded on the stimulable phosphor sheet A by the exposure device 10 to generate an image signal, an image processing controller 22 for controlling the image input/output apparatus 14 and the image filing apparatus 16 and processing the image signal for gradation correction, frequency processing, etc., an image output unit 24 for recording the image signal as a visible image on a photographic photosensitive material or film, and an image output unit 26 for displaying the image signal as a visible image on a CRT or the like. The patient and exposure information can be entered in the image processing controller 22 by reading an ID card on which the patient information is recorded and operating on a keyboard. The image reader 20 includes a mechanism for applying stimulating light such as a laser beam to the stimulable phosphor sheet A to cause the latter to emit light, for converting the light emitted from the stimulable phosphor sheet A to an image signal with a photomultiplier, and for applying erasing light to the stimulable phosphor sheet A from which the image signal has been read to initialize the stimulable phosphor sheet A for reuse. The image output unit 24 is responsive to the image signal from the image reader 20 for applying a laser beam to a photosensitive film and developing the film to generate a visible image. The other image output unit 26 displays the image signal on the CRT or other display.

The image filing apparatus 16 receives the image data before it is processed by the image processing controller 22 and also receives the retrieval data, then records the received data items on a hard disk and an optical disk, and will read the data when necessary.

Figure 2:
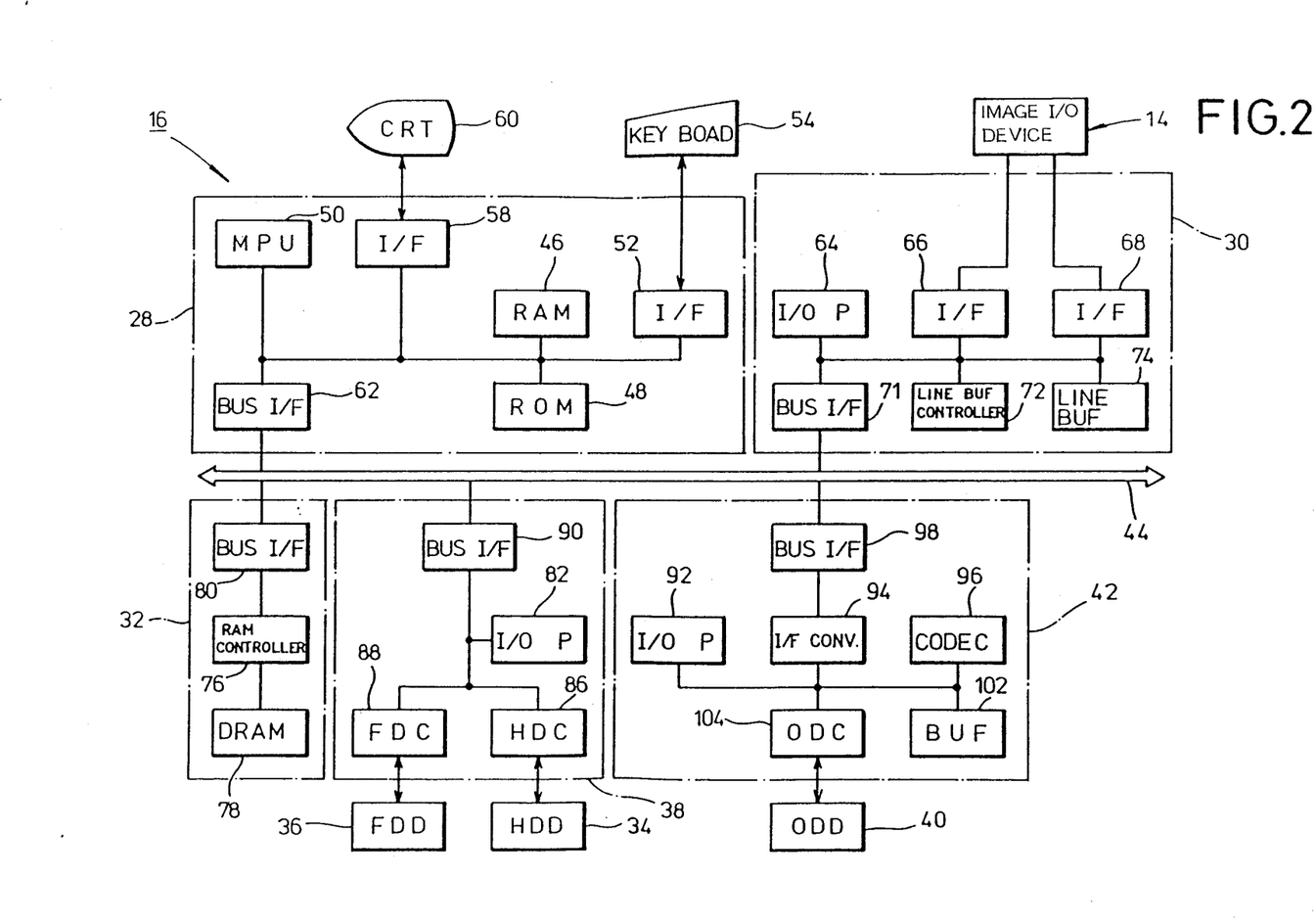
FIG. 2 is a block diagram of an image filing apparatus in the radiation image information processing system of the invention.

The image filing apparatus 16 will be described in greater detail with reference to FIG. 2.

The image filing apparatus 16 comprises a system control module 28, an interface module 30 serving as an input/output port connected to the image input/output apparatus 14, a memory module 32 serving as a main storage unit in the image filing apparatus 16, a disk control module 38 for controlling a hard disk driver 34 and a floppy disk driver 36, and a disk control module 42 for controlling an optical disk driver 40. These modules 28, 30, 32, 38, 42 are interconnected by a system bus 44.

The image filing apparatus 16 is controlled by an MPU 50 based on control data stored in a RAM 46 in the system control module 28 and a system program stored in a ROM 48 in the system control module 28. The RAM 46 is supplied with the control data from a key board 54 through a keyboard control interface 52. The condition of the image filing apparatus 16 is displayed on a display unit 60 such as a CRT or the like through a communication interface 58. A control signal from the MPU 50 is transferred to the modules 30, 32, 38 through a bus interface 62 and the system bus 44.

The interface module 30, as the input/output port between the image input/output apparatus 14 and the image filing apparatus 16, has a communication interface 66 controlled by an I/O processor 64, an image data interface 68, and a line buffer 74. The communication interface 66 is supplied with the retrieval data of the radiation image information and image processing information from the image input/output apparatus 14. The image data interface 68 is supplied with the image data of the object 12. The line buffer 74 is supplied with a line of image data from the image data interface 68. These retrieval data, image data, and image processing information are simultaneously processed by the I/O processor 64 so as to be transferred to the memory module 32 and the disk control modules 38, 42 through the bus interface 71 and the system bus 44. The image data which is delivered to the image data interface 68 is transferred to the disk control module 42 via the line buffer 74, the bus interface 71, and the system bus 44 under the control of the line buffer controller 72. More specifically, the line buffer 74 is supplied with the image data, one main scanning line at a time, which has been read by the laser beam in the image reader 20, and the stored data is successively transferred to the disk control module 42 under the control of the line buffer controller 72.

The memory module 32 has a DRAM 78 controlled by a RAM controller 76. The DRAM 78 stores an application program for the image filing apparatus 16 and the retrieval data from the image input/output apparatus 14, the application program and retrieval data being fed via a bus interface 80.

The disk control module 38 has a hard disk controller 86 and a floppy disk controller 88 which are controlled by an I/O processor 82 for driving the hard disk driver 34 and the floppy disk driver 36, respectively. The hard disk driver 34 is loaded with a hard disk which stores retrieval data transferred from the DRAM 78 of the memory module 32 via a bus interface 90. The floppy disk driver 36 is loaded with a floppy disk that stores the application program, for example, which will be stored into the DRAM 78 of the memory module 32 when the system starts to operate.

The disk control module 42 includes an interface converter 94 controlled by an I/O processor 92, and an image data compandor codec 96. The interface converter 94 serves to effect bus conversion between the internal bus of the disk control module 42 and the system bus 44. Where there are a plurality of disk control modules 42, the interface converter 94 in each of the disk control modules 42 expands its communication capability outside its casing. The codec 96, which comprises an encoder and a decoder, compresses image data when it is recorded on an optical disk, and expands the image data to its original state when the image data is reproduced. The disk control module 42 also includes a buffer 102 for absorbing processing time deviations or differences when line data (data for each scanning line) is recorded into the optical disk driver 40 through the codec 96. The disk control module 42 is supplied with image data from the interface module 30 through a bus interface 98. The supplied image data is compressed by the codec 96 and recorded on an optical disk in the optical disk driver 40 through the buffer 102 under the control of an optical disk controller 104. At the same time, retrieval data from the DRAM 78 of the memory module 32 is transferred and recorded on the optical disk.

Figure 4:
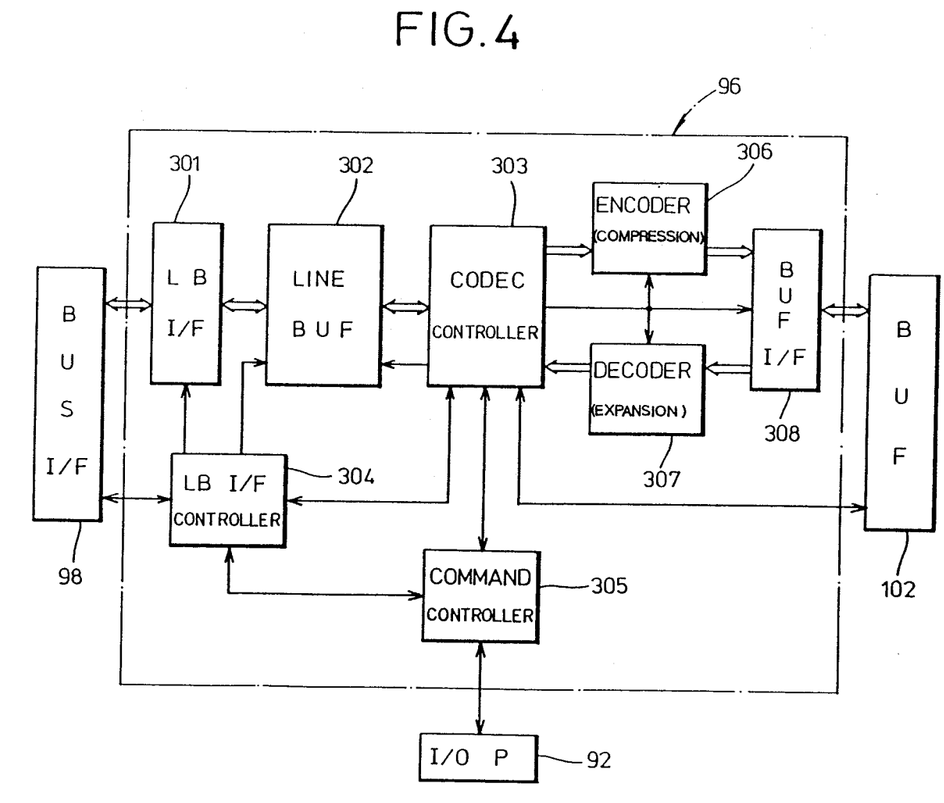
FIG. 4 is a block diagram of an image data compandor or codec in the image filing apparatus.

The codec 96 in the disk control module 42 is arranged as shown in FIG. 4. The codec 96 comprises a line buffer interface 301, a line buffer 302, a codec controller 303, a compressor or encoder 306, an expander or decoder 307, a line buffer interface controller 304, a command controller 305, and a line buffer interface 308. The line buffer interface 301 serves to deliver image data applied via the bus interface 98 (FIG. 2) to the line buffer 302 in the codec 96, the line buffer interface 301 being controlled by the line buffer interface controller 304. The line buffer 302 comprises an image buffer for storing plural lines of image data. The codec controller 303 is coupled between the line buffer 302 and the encoder 306 and the decoder 307 for controlling the encoder 306 and the decoder 307. The encoder 306 compresses image data from the line buffer 302, and decoder 307 restores the original image data by expanding the compressed image data from the optical disk. The line buffer interface controller 304 is responsive to a signal from the command controller 305 for controlling the line buffer interface 301 and the line buffer 302. The command controller 305 controls the entire codec 96 based on a control signal from the I/O processor 92 (FIG. 2).

Figure 5:
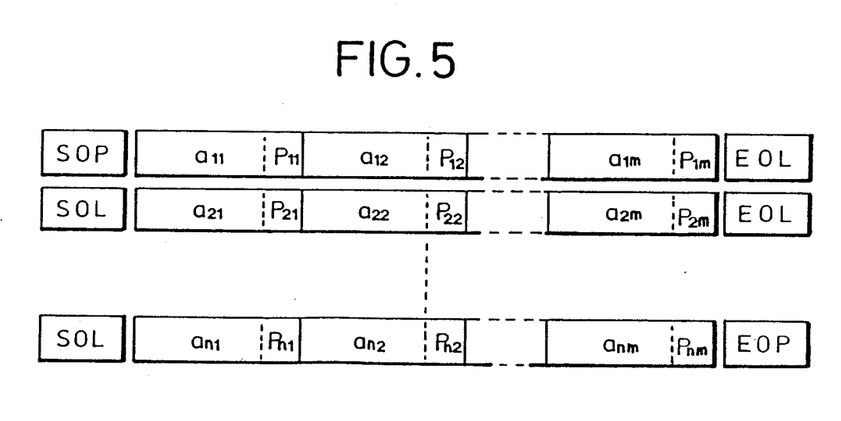
FIG. 5 is a diagram showing image data.

FIG. 5 shows the arrangement of image data which is handled by the radiation image information processing system described above. Each of the pixels of a radiation image recorded on the stimulable phosphor sheet A is scanned and read by the image reader 20. The readout pixels are converted to 10-bit gradation data items, for example, $a_{11}a_{12} \ldots a_{1m}, a_{21}a_{22} \ldots a_{2m}, \ldots, a_{n1}a_{n2} \ldots a_{nm}$, where m indicates the number of pixels in one scanning cycle, i.e., on one line, and n indicates the number of scanning lines, i.e., image lines. To the gradation data items for the respective pixels, there are added parity data items $P_{11}P_{12} \ldots P_{1m}, P_{21}P_{22} \ldots P_{2m}, \ldots, P_{n1}P_{n2} \ldots P_{nm}$. Each line of image data is associated with second control data items SOL, EOL at the starting and terminal ends for indicating the beginning and termination of the image data line. The image data for one image is associated with first control data items SOP, EOP at the starting and terminal ends for indicating the beginning and termination of the image data.

The control data items SOL, EOL, SOP, EOP are added or removed by the bus interface 71, for example. More specifically, when image data is transferred from the interface module 30 to the disk control module 42, the control data items SOL, EOL, SOP, EOP are added. When image data is transferred from the disk control module 42 to the interface module 30, the control data items SOL, EOL, SOP, EOP removed.

Figure 6:
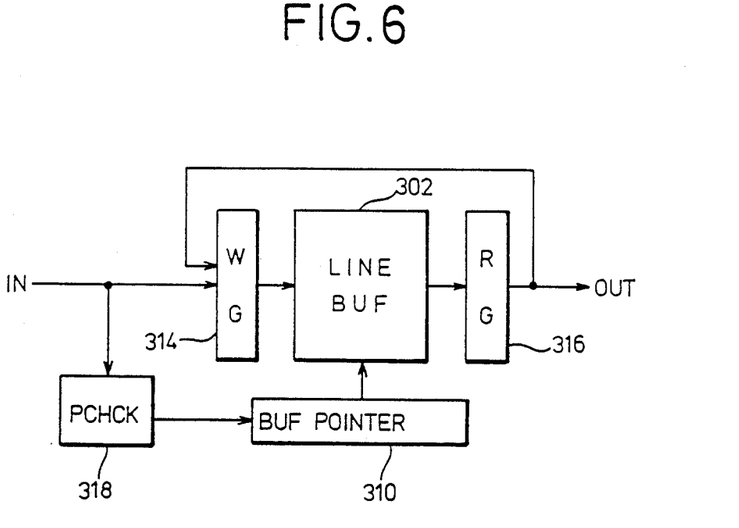
FIG. 6 is a block diagram of a circuit for correcting an error in image data.

FIG. 6 illustrates a circuit for detecting and correcting an error in image data which is constructed as shown in FIG. 5. By constructing the line buffer 74 in the image filing apparatus 16 or the line buffer 302 in the codec 96 as shown in FIG. 6, an data error can be eliminated which may be generated when image data is transferred from the image input/output apparatus 14 to the interface module 30, or from the interface module 30 to the disk control module 42, or from the optical disk driver 40 to the disk control module 42, or from the disk control module 42 to the interface module 30.

More specifically, the line buffer 74 in the image filing apparatus 16 or the line buffer 302 in the codec 96 is supplied with image data from IN, and image data is delivered out of the line buffer 74 in the image filing apparatus 16 or the line buffer 302 in the codec 96 via OUT. The supplied image data is stored, for one line at a time, via a write gate 314 into a location in a line buffer 312 which is addressed by a buffer pointer 310. The stored image data is read, for one line at a time, via a read gate 316 from a location in the line buffer 312 which is addressed by the buffer pointer 310. The reference numeral 318 denotes a parity check circuit for effecting a known parity check on each pixel using parity data $P_{11} \ldots P_{nm}$ added to the gradation data $a_{11} \ldots a_{nm}$ for each pixel.

Operation and advantages of the radiation image information processing system thus constructed will be described below.

The X-ray applied to the object 12 by the X-ray source 18 passes through the object 12 and forms an object image as a radiation transmitted image on the surface of the stimulable phosphor sheet A loaded in the exposure device 10. Then, the stimulable phosphor sheet A with the object image recorded thereon is loaded into the image reader 20 in the image input/output apparatus 14, and the recorded object image is converted to image data in the form of an electric signal under the control of the image processing controller 22.

More specifically, in the image reader 20, stimulating light such as a laser beam is applied in a main scanning direction to the stimulable phosphor sheet A while it is being fed in an auxiliary scanning direction, and light emitted from the stimulable phosphor sheet A in response to exposure to the laser beam is photoelectrically read by the photomultiplier and converted thereby to a digital signal indicative of the image data. After the image information has been read, the stimulable phosphor sheet A is exposed over its entire surface to erasing light to erase any remaining radiation image information therefrom, so that the stimulable phosphor sheet A can be used again for re-exposure in the exposure device 10.

The image data converted to the electric signal by the image reader 20 is processed for gradation correction, frequency processing, and the like as required, and issued as a visible image by the image output 24 or 26. In the image output unit 24, a laser beam modulated by the image data is applied in a main scanning direction to a photographic recording material or film as it is fed in an auxiliary scanning direction for thereby recording the image on the film. The image is then developed into a visible image on the film. In the image output unit 26, an object image according to the image data is displayed on the screen of a CRT or the like.

The radiation image information produced by the image reader 20 in the image input/output apparatus 14 is transferred to the image filing apparatus 16 through the interface module 30 thereof. Retrieval data and image processing information are fed to the communication interface 66 under the control of the I/O processor 64, whereas image data is fed to the image data interface 68 under the control of the I/O processor 64.

The retrieval data and image processing information delivered to the communication interface 66 are transferred to the memory module 32 through the bus interface 71 and the system bus 44, and then stored into the DRAM 78 via the bus interface 80 under the control of the RAM controller 76. The retrieval data and image processing information stored in the DRAM 78 are then transferred to the disk control module 38 via the system bus 44 under the control of the MPU 50 of the system control module 28. The retrieval data supplied to the disk control module 38 via the bus controller 90 thereof is recorded on a hard disk via the hard disk driver 34 driven by the hard disk controller 86.

The retrieval data stored in the DRAM 78 is also transferred to the disk control module 42. The retrieval data delivered via the bus interface 98 is transferred to the buffer 102 through the interface converter 94 under the control of the I/O processor 92, and then recorded on an optical disk via the optical disk driver 40 driven by the optical disk controller 104. The image processing information stored in the DRAM 78 is transferred only to the disk control module 42 and recorded thereby on the optical disk.

The image data supplied to the image data interface 68 in the interface module 30 is transferred, one scanning line at a time, to the line buffer 74 under the control of the I/O processor 64. The image data for each scanning line or line data is transferred to the disk control module 42 via the bus interface 71 and the system bus 44 under the control of the line buffer controller 72.

In the bus interface 71, control data SOP or SOL (FIG. 5) is added to the starting end of each line data, and control data EOL or EOP is added to the terminal end of each line data, by the I/O processor 64. The line data is then transferred to the disk control module 42.

Figure 7:
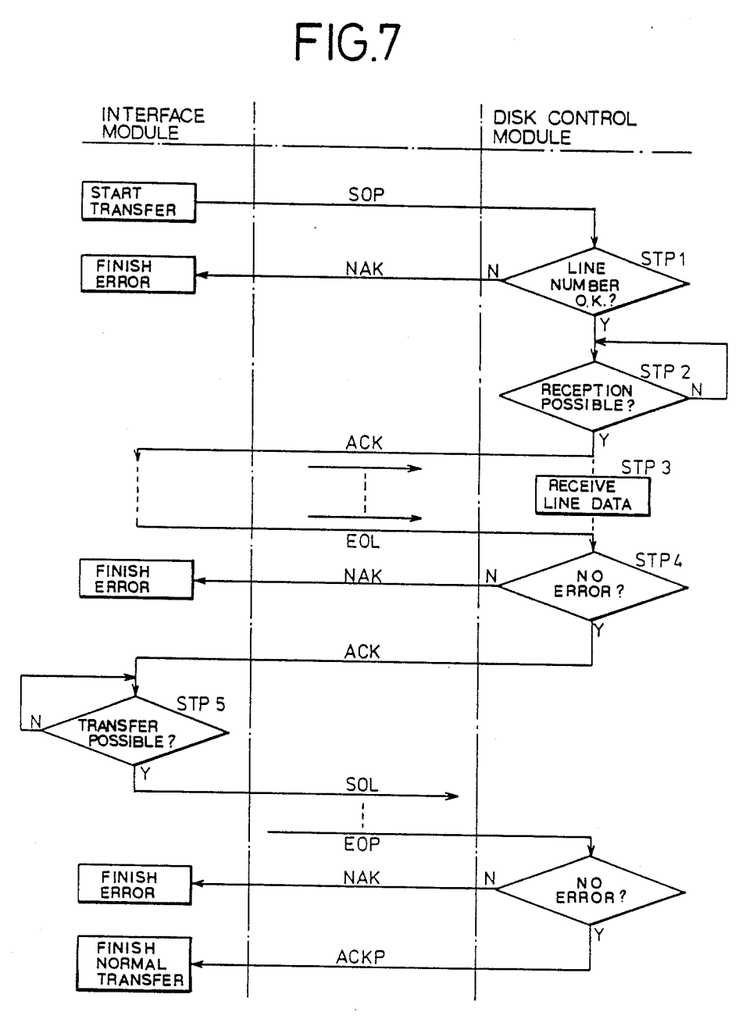
FIG. 7 is a flowchart of a sequence for transmitting image data.

Transfer of image data from the interface module 30 to the disk control module 42 will be described with reference to the flowchart of FIG. 7.

The control data SOP added to the head of the image data is first transferred to the disk control module 42. In response to the control data SOP, the disk control module 42 checks the control data SOP at the bus interface 98 in a step 1. If no starting end of the image data is indicated, then an error signal NAK is transferred to the interface module 30 to stop the transfer of the image data. If the starting end of the image data is indicated, then a step 2 checks if the codec 96 is capable of data reception. If yes, then a data transfer command signal ASK is issued to the interface module 30. As a result, the interface module 30 starts transferring gradation data $a_{11}a_{12} \ldots a_{1m}$ with parity data $P_{11}P_{12} \ldots P_{1m}$ from the bus interface 71 to the disk control module 42 in a step 3.

Upon transfer of a prescribed number of gradation data $a_{11}a_{12} \ldots a_{1m}$ from the interface module 30 to the disk control module 42, control data EOL added to the terminal end of the image data line is transferred to the disk control module 42. The bus interface 98 in the disk control module 42 checks the control data EOL in a step 4. If no terminal end of the line data is indicated, then an error signal NAK is transferred to the interface module 30 to stop the transfer of the image data. If the terminal end of the line data is indicated, then a data transfer command signal ASK is applied to the interface module 30. The bus interface 71 of the interface module 30 ascertains whether the line buffer 74 is capable of transferring data in a step 5. If yes, then the control data SOL is transferred to the disk control module 42. The line data items are successively transferred in the same manner as the control data SOP.

If a prescribed number of lines of line data are transferred from the interface module 30 to the disk control module 42, control data EOP is finally transferred. The bus interface 98 then checks the control data EOP. If no terminal end of the image data is indicated, then an error signal NAK is transferred to the interface module 30 to stop the transfer of the image data. If the image data is finished, then a transfer completion signal ACKP is transferred to the interface module 30 to finish normal data transfer.

The line data which has been transferred to the disk control module 42 is applied to the codec 96 through the bus interface 98 and the interface converter 94. The encoder 306 of the codec 96 compresses the image data by effecting an encoding process to eliminate redundancies of the line data. The compression of the image data is carried out by computing the difference between adjacent pixel data items of a plurality of pixel signals of the line data, and replacing the computed difference with a binary code known as the Huffman code (see Japanese Pat. Application No. 61-23475 for the data compression and data expansion described later).

More specifically, as shown in FIG. 4, the line data fed to the line buffer interface 301 in the codec 96 is stored in the line buffer 302 under the control of the line buffer interface controller 304, delivered to the encoder 306 via the codec controller 303, compressed by the encoder 306, and then fed via the buffer interface 308 to the buffer 102. The line buffer interface controller 304 controls the image transfer protocol, and the command controller 305 controls mainly the codec controller 303 dependent on instructions from the I/O processor 92 (which are indicative of how many pixels are contained in one line, which line the image data belongs to, whether compression or expansion is to be made, or what compression rate is to be employed). Under the control of the codec controller 303, the image data is compressed by the encoder 306 based on a compression algorithm, packed for each word by the buffer interface 308, and then transferred to the buffer 102. The most important point in the operation of the codec 96 is that the line buffer 302 is provided for absorbing the difference between the rate of the image data transmitted from the interface module 30 (FIG. 2) and the rate at which the image data is written on the optical disk, and a signal representative of the condition of the line buffer 302 is fed from the line buffer interface controller 304 as the latter observes the condition of the data in the line buffer 302, for thereby controlling the flow of the image data. Therefore, the image data can highly efficiently be written on and read out of the optical disk.

The line data compressed by the codec 96 is temporarily stored in the buffer 102, and thereafter recorded on the optical disc by the optical disk driver driven by the optical disk controller 104. Likewise, the line data items corresponding to the other scanning lines are recorded on the optical disk while they are being compressed. The buffer 102 eliminates the difference between the processing speed of the codec 96 and the recording speed of the optical disk driver 40 for allowing efficient processing. As a result, the retrieval data and the compressed image data can be recorded highly effectively on the optical disk.

The transfer of the retrieval data from the interface module 30 to the disk control module 38 and the transfer of the image data from the interface module 30 to the disk control module 42 are simultaneously carried out by the I/O processor 64 of the interface module 30. More specifically, the interface module 30 has the communication interface 66 which stores the retrieval data and the image data interface 68 which stores the image data, and the interfaces 66, 68 are simultaneously controlled by the I/O processor 64 for storing the respective data items efficiently in the respective recording mediums. The process of storing the data in the disks can therefore be highly efficiently effected without substantially taking into account the time required for the MPU 50 to convert the retrieval data to a data base and store the retrieval data in the hard disk.

A process of reading desired radiation image information from the optical disk and reproducing the same will hereinafter be described.

Instruction data for picking up desired image data is entered through the keyboard 54 of the image filing apparatus 16. The entered instruction data is stored into the RAM 46 through the keyboard control interface 52 of the system control module 28. The system control module 28 executes a predetermined retrieval program to issue a control signal to the disk control module 38 based on the instruction data stored in the RAM 46 for taking out the desired retrieval data from the retrieval data base stored in the hard disk.

The MPU 50 of the system control module 28 applies a control signal to the disk control module 42 to instruct the reading of image data corresponding to the desired retrieval data taken from the hard disk based on the instruction data. The disk control module 42 controls the optical disk controller 104 with its I/O processor 92 to pick up the image data corresponding to the retrieval data from the optical disk. The image data is then fed to the buffer 102.

The image data stored in the buffer 102 is converted or expanded to the original image data by the decoder 307 of the codec 96, and then fed to the line buffer 302 via the codec controller 303. The expanded image data is then delivered from the line buffer 302 through the line buffer interface 301, the interface converter 94, the bus interface 98, and the system bus 44 to the interface module 30. The transfer of the image data from the disk control module 42 to the interface module 30 is the same as the transfer of the image data from the interface module 30 to the disk control module 42, and hence will not be described in detail.

After the control data items SOP, SOL, EOL, EOP have been removed by the bus interface 71, the image data fed to the interface module 30 is delivered to the image data interface 68 through the line buffer 74 under the control of the I/O processor 64 and the line buffer controller 72, and is then transferred to the image processing controller 22 in the image input/output apparatus 14. At this time, the image processing information which is recorded together with the image data is also read out and delivered via the buffer 102, the interface converter 94, the bus interface 98, and the system bus 44 to the interface module 30. The image processing information fed to the interface module 30 is transferred to the image processing controller 22 in the image input-/output apparatus 14 through the communication interface 66 under the control of the I/O processor 64. The retrieval data is also delivered through the system bus 44 to the interface module 30, and then through the bus interface 71 to the communication interface 66, from which the retrieval data is transferred to the image processing controller 22 in the image input/output apparatus 14.

In the image processing controller 22, the image data is processed for gradation correction, frequency processing, and the like based on the image processing information recorded with the image data, and is then reproduced as a visible image in the image output unit 24 or 26.

In this manner, image information is stored in the optical disk, and retrieved from the optical disk and reproduced as a visible image. The image data may however be subject to errors during the transfer thereof from the image input/output apparatus 14 to the interface module 30, from the interface module 30 to the disk control module 42, or vice versa. The line buffer 74 shown in FIG. 2 may be constructed as shown in FIG. 6 for correcting such a data error by replacing the data of a line containing a pixel having a detected parity error with the data of a line which precedes or follows the line containing the pixel with the detected parity error. More specifically, the value of the buffer pointer 310 is decremented by 1 to read out, through the read gate 316, the image data of a line preceding the line containing the pixel with the detected parity error, and then the value of the buffer pointer 310 is restored or incremented by 1 to store the image data of the preceding line into the line buffer 312 through the write gate 314, thus correcting the image. This image data correcting principle is based on the fact that radiation images handled by the system of the present invention are of such a property that the gradations of adjacent lines or pixels do not vary abruptly but continuously vary relatively smoothly, unlike general binary data. With such an image property, even if the image data of a line or a pixel having a parity error is replaced with the image of a preceding or following line or pixel, the reconstructed image does not differ widely from the original image.

The error correcting circuit shown in FIG. 6 replaces the image data of an entire line. However, it can readily be understood that it is possible to replace the image data of each pixel, and also to replace the image data of a line or pixel with the average image data of surrounding lines or pixels, rather than just the image data of a preceding or following line or pixel.

Data transfer between the system control module 28, the interface module 30, the memory module 32, the disk module 38, and the disk control module 42 can be effected through the common system bus 44 which comprises a synchronous bus. More specifically, the addresses of control data, retrieval data, image data, and image processing information between the modules are pre-mapped in the memory space of the MPU 50 in the system control module 28. The MPU 50 addresses the data according to the map in its memory. Therefore, the bus line interconnecting the modules is quite simple in construction.

Figure 8:
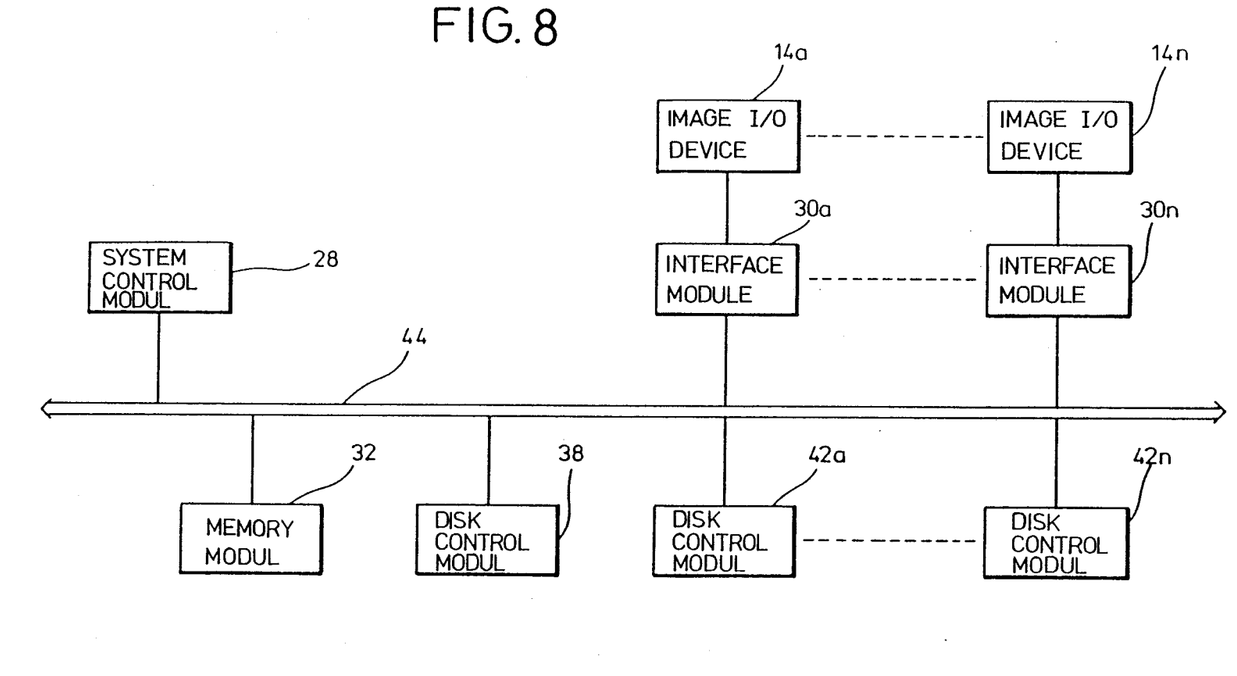
FIG. 8 is a schematic diagram of a radiation image information processing system according to another embodiment of the present invention.

Since a certain module is addressed by using the common system bus 44, the system can easily be expanded. More specifically, as shown in FIG. 8, a plurality of interface modules 30a through 30n may be connected to the system bus 44, a plurality of disk control modules 42a through 42n may be connected to the system bus 44, and a plurality of image input/output apparatus 14a through 14n may be connected respectively to the interface modules 30a through 30n. Any combination of the image input/output apparatus 14a through 14n and the disk control modules 42a through 42n is established by specifying the address of a destination to which data is to be transferred. Addresses are given in advance to the respective modules 30a through 30n, 42a through 42n. The destination to which data is to be transferred can be changed by varying the base address. Therefore, should any of the image input/output apparatus 14a through 14n or the disk control modules 42a through 42n fail, the corresponding module can be changed by varying the base address for quickly continuing data processing. As a consequence, the system is highly suitable for use in applications requiring prompt processing such as medical diagnosis.

With the present invention, as described above, radiation image information is read from a recording medium, processed, and reproduced as a visible image on a film, a CRT, or the like. The radiation image information is also recorded together with its retrieval data on a randomly accessible recording medium such as an optical disk, and can be read as required based on the retrieval data. Therefore, a large amount of radiation image information can be recorded on a compact recording medium, so that it can easily be kept and supervised while greatly reducing the space needed to store such radiation image information.

Image data and retrieval data with respect thereto are simultaneously recorded on the recording medium. Thus, any desired image data can rapidly be picked up and reproduced by using its retrieval data. Where the system of this type is used in the medical field, it is capable of assisting in performing appropriate medical diagnosis highly efficiently.

With control data added to image data to be transferred, errors that may occur during transfer of the image data can be checked. The process of checking an error is much simpler than handshaking checking of each pixel, and can adequately correct an otherwise fatal error such as a line deviation or a line drop in image data.

The process of editing and recording retrieval data on a hard disk and the process of recording image data on an optical disk are simultaneously carried out. This reduces the time required to record medical image information on a recording medium, and simplifies operation for recording such medical image information.

Different speeds or rates for processing image data are adjusted by buffers. Consequently, data processing between input and output devices can be effected smoothly, so that a radiation image having a vast amount of data can efficiently be recorded on an optical disk.

Various control modes such as for data transfer, data supervision, and data retrieval are effected by input-/output processors separate from the main processor, which is therefore free from an excessive burden and can process data efficiently.

The radiation image information system of the present invention can also be connected to a CT apparatus or an MR apparatus, rather than the illustrated image input/output apparatus which reads radiation image information recorded on a stimulable phosphor sheet and generates an image.

Although certain preferred embodiments have been shown and described, it should be understood that many changes and modifications may be made therein without departing from the scope of the appended claims.

What is claimed is:

1. A radiation image information processing system comprising:
    an image reader for photoelectrically reading radiation image information recorded on a stimulable phosphor sheet and for converting the read image information to image data represented by a digital signal;
    an image output apparatus for producing the image data as a visible image;
    an image filing apparatus for recording said image data together with retrieval data therefor on a randomly accessible recording medium and for reading the image data from said recording medium based on said retrieval data; and
    an image processing controller for controlling said image reader, said image output apparatus, and said image filing apparatus and processing said image data, said image output apparatus and said image filing apparatus being connected to receive image data from said image reader so that said image data is produced by said image output apparatus as the visible image and, simultaneously, said image data and said retrieval data therefor are stored in the recording medium by said image filing apparatus.

2. A radiation image information processing system according to claim 1, wherein said image output apparatus includes first image output means for producing the image data on a photographic photosensitive film, and second image output means for producing the image data on a CRT display.

3. A radiation image information processing system according to claim 1, wherein said image filing apparatus includes a hard disk device for storing said retrieval data and an optical disk device for storing said retrieval data and said image data.

4. A radiation image information processing system according to claim 1, wherein said image filing apparatus includes an interface module for controlling transfer of said image data and said retrieval data between said image reader and said image output apparatus.

5. A radiation image information processing system according to claim 4, wherein said interface module has a first interface for processing said image data and a second interface for processing said retrieval data, said first and second interfaces storing the respective data simultaneously in said optical disk device and said hard disk device.

6. A radiation image information processing system according to claim 5, wherein said interface module further includes an input/output processor for controlling said first and second interfaces and a buffer memory connected to said first interface.

7. A radiation image information processing system according to claim 1, wherein said image filing apparatus includes a codec for compressing said image data to be recorded on said recording medium and for expanding the image data read from said recording medium, and a buffer connected between said codec and a driver for reading the image data from said recording medium.

8. A radiation image information processing system according to claim 7, wherein said codec comprises a line buffer interface, a line buffer, a line buffer interface controller, a codec controller, an encoder, a decoder, a buffer interface, and a command controller.

9. A radiation image information processing system according to claim 8, wherein said line buffer has an image buffer for storing plural lines of image data.

10. A radiation image information processing system according to claim 8, wherein said buffer interface has means for packing the image data after it has been compressed.

11. A radiation image information processing system according to any one of claims 8 through 10, wherein said line buffer is controlled by said line buffer interface controller to adjust the rate of input or output image data and the rate of output or input image data.

12. A radiation image information processing system according to claim 4, wherein said image data is combined with first image transfer control data indicative of the starting and terminal ends of one image and second image transfer control data indicative of the starting and terminal ends and the identification number of each scanning line of one image, the arrangement being such that said image data is transferred, one scanning line at a time, between said interface module of the image filing apparatus and a recording module which records the image data on the recording medium or reads the image data from the recording medium.

13. A radiation image information processing system comprising: an image reader for reading radiation image information and converting the same to image data represented by a digital signal; an image output apparatus for producing the image data as a visible image; an image filing apparatus for recording said image data together with retrieval data therefor on a randomly accessible recording medium and for reading the image data from said recording medium based on said retrieval data; and an image processing controller for controlling said image reader, said image output apparatus, and said image filing apparatus and processing said image data, the arrangement being such that said image data is produced by said image output apparatus and simultaneously stored in the recording medium by said image filing apparatus, wherein said image data comprises gradation data indicative of gradations of pixels in lines and parity data added to respective gradation data, the arrangement being such that when a parity error is detected in gradation data corresponding to a certain pixel, said pixel is estimated by and replaced with a pixel in the vicinity thereof or a line containing said certain pixel is estimated by and replaced with a line in the vicinity thereof.

* * * * *